No. 642,293. Patented Jan. 30, 1900.
L. BUIS.
DEVICE FOR TIGHTENING WHEEL RIMS.
(Application filed May 4, 1899.)
(No Model.)
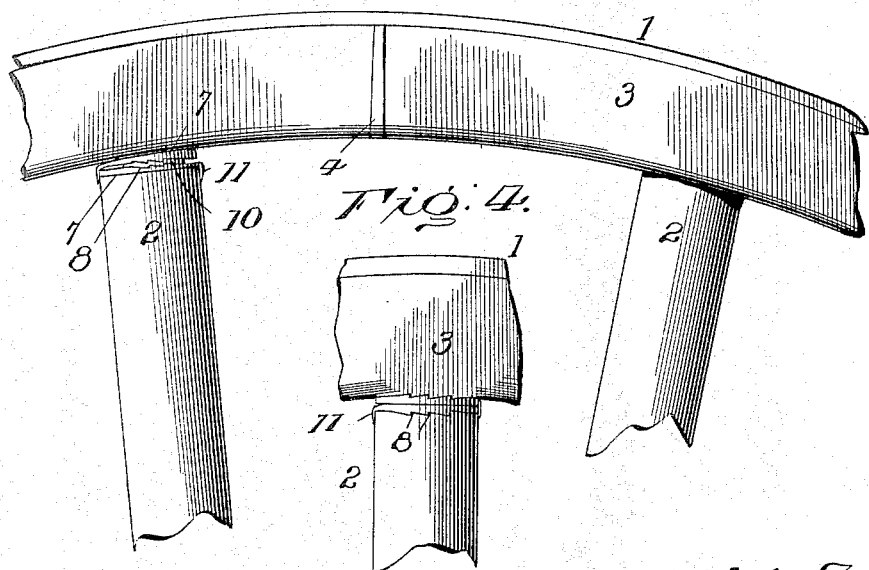
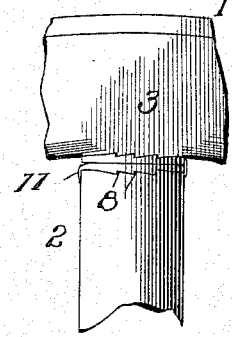
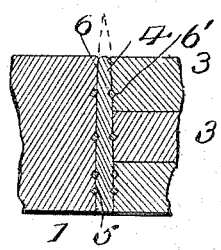
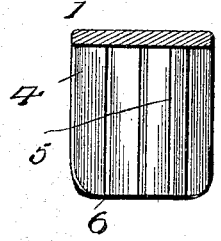
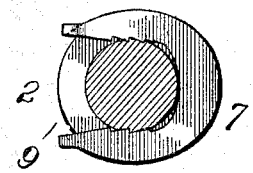
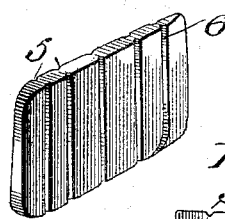
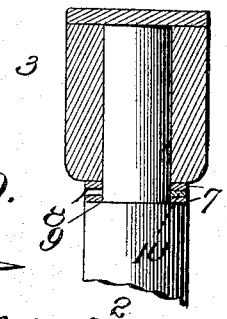
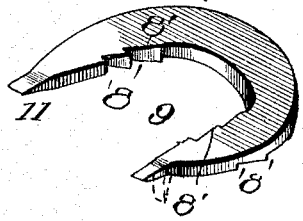
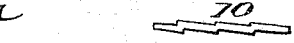
Witnesses
Jno Toomie
H. L. Gould.
Inventor
Lemuel Buis.
by Benj. R. Catlin
Attorney

UNITED STATES PATENT OFFICE.

LEMUEL BUIS, OF LITTLE ROCK, ARKANSAS.

DEVICE FOR TIGHTENING WHEEL-RIMS.

SPECIFICATION forming part of Letters Patent No. 642,293, dated January 30, 1900.

Application filed May 4, 1899. Serial No. 715,573. (No model.)

*To all whom it may concern:*

Be it known that I, LEMUEL BUIS, a resident of Little Rock, in the county of Pulaski and State of Arkansas, have invented certain new and useful Improvements in Devices for Tightening Wheel-Rims; and I do hereby declare the following to be a full, clear, and exact description of the invention, such as will enable others skilled in the art to which it pertains to make and use the same.

The invention relates to wheels, and has for its object to provide simple and efficient means for tightening wheel rims and spokes without removing the tire.

The invention consists in the construction hereinafter described and pointed out.

In the accompanying drawings, Figure 1 is an elevation of a portion of a wheel, showing the improved devices applied thereto. Fig. 2 is a partial section of a rim including a rim-tightening device. Fig. 3 is a perspective of the rim-tightening device. Fig. 4 is a partial elevation showing a spoke-tightening device applied to a wheel. Fig. 5 is a plan of the rim-tightening device, a tire being shown in section. Fig. 6 is a section of tire, rim, and spoke tightening device. Fig. 7 is a plan of the spoke-tightening device, the spoke-tenon being shown in section. Fig. 8 is a perspective of a spoke-tightening device. Fig. 9 is a perspective of a tightening-wedge of another form. Fig. 10 is an edge view of a supplementary key.

Fig. 1 represents a small part of a wheel, and numeral 1 denotes its tire.

2 indicates spokes, and 3 fellies.

In case the wheel-rim becomes loose from shrinkage of the wood of the fellies or other cause a wedge 4 is driven between the proximate ends of two fellies and transversely to the wheel-rim. This has the effect to force apart the fellies contiguous the wedge and tightens the wheel-rim circumferentially. It will be understood that the customary dowel-pin will be omitted or removed by cutting when the wedge is to be applied. The wedge may be made sufficiently sharp to effect this cutting.

To provide for the insertion of the device 4, it is made in the form of a thin wedge to adapt it to be driven between the fellies. The wedge or wedges 4 are also made thinner toward one edge transversely of their length to correspond to a similar variation in the space between two shrunken and separated fellies.

5 and 6 denote transverse grooves formed in the wedges. The oppositely-adjacent grooves 6 provide lines of fracture, whereby surplus-age of the wedge can be easily broken off at either end, as required in practice, the wedge being originally longer than the thickness of the fellies. These grooves 6 may be made slightly curved or with inclined faces, and placed quite near each other and in considerable number to provide for trimming the wedge to the actual thickness of the rim, after which it may be fixed by brads. The grooves 5 are situated in the middle part of the wedge and between the ends of the fellies. Their purpose is to receive nails or the like driven into them to act as keys to prevent the slipping or knocking out of the wedges. Nails 6', driven into the grooves, as indicated in Fig. 2, are partly embedded in the fellies and prevent their lateral displacement. They also add to the thrust of the wedge upon the felly ends and perform the office of dowel-pins. The grooves 6 are preferably not situated immediately opposite each other, but in staggered order, as illustrated in Fig. 9.

The wedges may be made of any suitable material, such as wood or steel, and driven between the ends of fellies at one or more points in the wheel-rim.

To compensate for the endwise shrinkage of the wheel-spokes, which will become more apparent upon the enlargement of the wheel-rim by the wedges applied as described, I provide devices, such as shown in Figs. 7 and 8, comprising coöperating U-shaped washers 7, each adapted to embrace the spoke-tenon between a shoulder on the spoke and the inner surface of the wheel-rim. The forked members of these washers are made wedge-shaped, as shown, and the proximate inclined faces of the forks of each have transverse grooves or serrations 8 to insure their engagement with each other to prevent slipping. These washers have oblong openings 9 between their members, whereby they are adapted to be forced together in manner to crowd between the wheel-rim and the shoulder of the spoke and tighten the latter when loosened by the action of a wedge, such as first described. To insure that the U-shaped members having locking grooves and corrugations 8 shall be made tight, a corrugated subsidiary key 10 may be inserted between the said members after the washers have been forced toward each other to tighten the spoke, as stated.

By the coöperation of the specified means of tightening the rim and spokes a loose wheel can easily be made solid without removal of the tire by a person of ordinary skill and with ordinary tools. A pair of nippers can be used for breaking the ends of the wedges along the prepared breaking-lines; but they are not essential and usually a hammer will suffice.

The above-described corrugated subsidiary key 10 is not essential, and if it is preferred the washers may be applied with their smooth faces contiguous, and so that the serrations 8 shall be pressed into the wood of the spoke and felly, respectively, as shown in Fig. 4.

Serrations or teeth 8' are formed on the interior faces of the washer members, so that when a washer is driven over a tenon said teeth bite into it and are held thereby. Each washer is secured in similar manner and is practically irremovable except after removal of a felly, and even in that case they are held on the tenon securely.

The limbs or members of the washer are preferably flared to facilitate its application to the spoke. In some cases said members are provided with wedge-like terminations 11, having preferably the same or a greater flare than the bodies of said members. These wedges are made with thin entering edges and are preferably flexible to permit them to be bent to clench the washers, and thus coöperate to obviate their loosening and the cutting of the spoke-tenon, as in washers heretofore used, by the constant jar to which they are subjected. In some cases a single washer or wedge 7 will suffice and the teeth 8' will hold it in place, though the clenchers 11 may be used as a supplementary fastening.

Having now described my invention, what I claim is—

1. In combination with a wheel-rim, a tightening-wedge provided with breaking-grooves, said wedge having a length greater than the thickness of the rim.

2. In combination with a wheel-rim, a tightening-wedge provided with key-grooves 6 and nails 6'.

3. In combination with a wheel-rim, a tightening-wedge, and a spoke, the U-shaped washers having the inclined proximate faces of their parallel members transversely grooved and a subsidiary key 10.

4. In combination with a wheel-rim, a tightening-wedge and a spoke, the U-shaped washers having the proximate faces of their parallel members transversely grooved and a subsidiary key 10.

5. In combination with a wheel-rim, a tightening-wedge, and a spoke, the U-shaped washer having the inner edges of its members transversely serrated to bite the spoke-tenon.

6. In combination with a wheel-rim, a tightening-wedge, and a spoke, the U-shaped washer having the inner edges of its members transversely serrated to bite the spoke-tenon, one or more transverse grooves on the flat faces of the members and one or more keys.

7. In combination with a wheel-rim and spoke, an approximately U-shaped washer embracing the spoke-tenon and having flexible wedge termination 11, folded one upon a spoke one upon a felly.

In testimony whereof I have signed this specification in the presence of two subscribing witnesses.

LEMUEL BUIS.

Witnesses:
W. C. RATCLIFFE,
R. W. IRVIN.